United States Patent [19]
Aten et al.
[11] 3,812,346
[45] May 21, 1974

[54] PHOTOSENSITIVE DEVICE WITH CONNECTION ELECTRODES ON MAJOR SURFACE AND FLOATING ELECTRODE ON OPPOSITE SURFACE

[75] Inventors: Albert Christiaan Aten; Johannes Gerrit Van Santen; Fredericus Hendricus Ignatius Renirie, all of Emmasingel, Eindhoven, Netherlands

[73] Assignee: U.S. Philips Corporation, New York, N.Y.

[22] Filed: Jan. 26, 1973

[21] Appl. No.: 326,778

Related U.S. Application Data

[63] Continuation of Ser. No. 199,197, Nov. 16, 1971, abandoned, which is a continuation of Ser. No. 66,114, Aug. 21, 1970, abandoned, which is a continuation of Ser. No. 751,287, Aug. 8, 1968, abandoned.

[30] Foreign Application Priority Data

Aug. 25, 1967 Netherlands ...................... 6711759

[52] U.S. Cl. ................................ 250/211 R, 338/15
[51] Int. Cl. ................................ H01c 7/08
[58] Field of Search ............... 250/211, 213; 338/15

[56] References Cited

UNITED STATES PATENTS

| | | | |
|---|---|---|---|
| 2,948,816 | 8/1960 | Van Santen et al. ........... | 250/213 R |
| 3,247,477 | 4/1966 | Fridrich ............................... | 338/15 |

*Primary Examiner*—Archie R. Borchelt
*Assistant Examiner*—T. N. Grigsby
*Attorney, Agent, or Firm*—Frank R. Trifari

[57] ABSTRACT

A photosensitive device is described in which both connection electrodes which convey current to and from the photosensitive layer, are provided on the same surface, and the opposite surface is provided with a single auxiliary electrode. A monograin layer construction is also described. Among the advantages are lower resistances and ease of manufacture.

12 Claims, 3 Drawing Figures

INVENTORS

Figure 1:
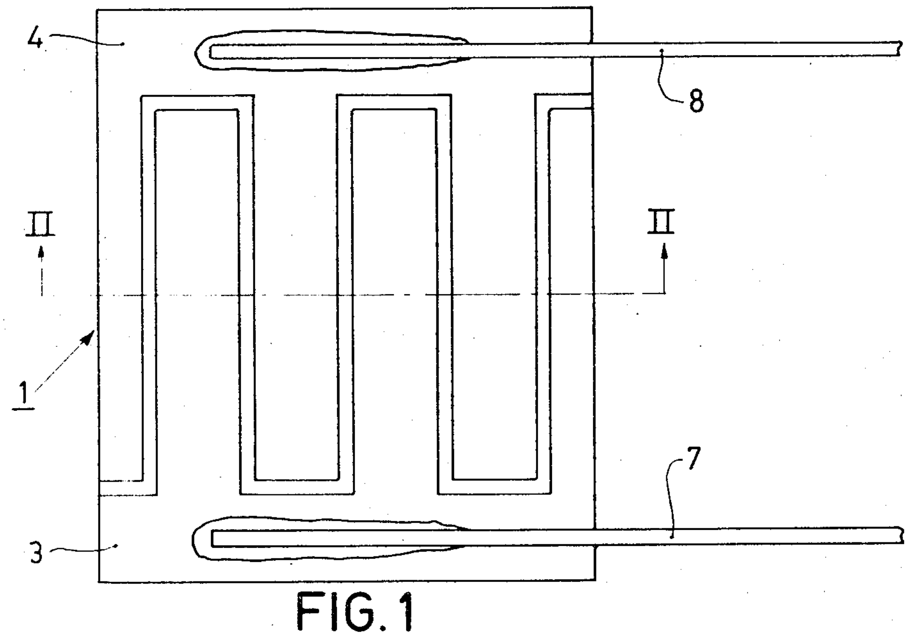

ALBERT C. ATEN
JOHANNES G. VAN SANTEN

BY

F R. Trifari
AGENT

PHOTOSENSITIVE DEVICE WITH CONNECTION ELECTRODES ON MAJOR SURFACE AND FLOATING ELECTRODE ON OPPOSITE SURFACE

This is a continuation of application Ser. No. 199,197, filed Nov. 16, 1971, which is a continuation of application Ser. No. 66,114, filed Aug. 21, 1970, which is a continuation of application Ser. No. 751,287, filed Aug. 8, 1968 all of which are now abandoned.

The invention relates to a photosensitive device having a stratified body which contains a photosensitive material, the stratified body comprising at least two electrodes to which a connection conductor is secured.

Photoresistors are known having a layer of a photosensitive material, in many cases an $A_{II}$-$B_{VI}$-compound, for example, cadmium sulphide, which is provided on an insulating carrier, two electrodes being arranged on the free surface of the layer and having connection conductors secured thereto. In mass production it is very important that the electrodes provided with connection conductors are located on the same side of the layer. The carrier promotes the ready handling of the layer and facilitates mounting in an envelope.

In these photoresistors, in which the radiation is incident on the free surface of the layer, the resistance is proportional to the distance between the electrodes, provided said distance is not too small. It has in fact been found that with electrode distances smaller than approximately 200 microns, the resistance does no longer descrease proportionally with the decrease of the electrode distance, so that it becomes very difficult to reach low resistances. A second impediment for reaching low resistances in this type of photosensitive resistors is associated with the method of manufacturing. Because other methods give rise to difficulties it is common practice that in this type of photosensitive resistors the electrodes are provided by deposition from the vapour phase. The deposition from the vapour phase is effected through masks so as to avoid photoresist methods and etching treatments. It will be obvious that the use of masks in vapour deposition restricts the minimum distance to be realized between the electrodes and that this results in a lower limit for the resistance to be realized.

It is the object of the invention to avoid the above-mentioned drawbacks and the invention is based inter alia on the recognition that, while maintaining the electrodes which are provided with connection conductors and are located on the same side of the layer, it is possible in a simple manner to make the effective distance between the electrodes smaller than their actual distance by the addition of an auxiliary electrode layer.

In another type of known photosensitive devices, the stratified body consists of a so-called monograin layer, which is a layer of grains, thickness approximately 1 grain, in which the photosensitive grains cohere by means of an insulating binder. In these devices the electrodes and the connection conductors must be provided on different sides of the layer since the monograin layer does not show electric conductivity in the lateral direction. In these devices at least one of the electrodes is permeable to radiation in the desired frequency range.

The fact that in the last-described photosensitive devices the electrodes are located on either side of the monograin layer must be considered a serious drawback of these devices from a point of view of manufacture. Series production of these devices would be considerably simpler and consequently cheaper if the two electrodes provided with connection conductors were located on the same side of the monograin layer.

A further object of the invention is to provide a photosensitive device having a monograin layer in which the two electrodes provided with connection conductors are located on the same side of the monograin layer and the invention is based on the recognition of the fact that this can easily be reached by using an auxiliary electrode layer.

According to the invention, a photosensitive device of the type mentioned in the preamble is characterized in that electrodes to which a connection conductor is secured are arranged only on one side of the stratified body, the oppositely located side of the stratified body being provided with an auxiliary electrode layer.

In photosensitive devices according to the invention, a current which flows through the device will pass the layer two times in a direction substantially at right angles to the direction of the layer as a result of the addition of the auxiliary electrode. As a result of this the layer thickness is decisive of the effective distance of the electrodes; the actual distance between the electrodes is not critical and can be adapted without objection to the method of manufacturing.

In photoresistors employing a monograin layer, the lack of conductivity in the lateral direction in the layer has been met in a simple manner by the use of the invention.

Furthermore it is of importance that in using the invention the breakdown voltage of the device is higher than in similar devices of the known types.

In addition, when using the invention, a compensating effect occurs for undesired photoelectric and thermoelectric voltages. Because in fact the current flows through the layer both in one direction and in the opposite direction, internal e.m.f.'s, if any, will occur both with one and with the opposite polarity.

Preferably, at least the auxiliary electrode layer is permeable at least for a part of the frequency range of the electromagnetic radiation to which the stratified body is sensitive.

When using such a permeable auxiliary electrode layer the radiation may be incident through the auxiliary electrode layer. The advantage of this is that the total surface of the stratified device may be used as a photosensitive surface. In the known devices described a part of the surface must be used for the connection of one or two connection conductors.

A further important advantage of the invention is that the heat dissipation can be improved. In the first instance, the heat dissipation will have to take place through the connection conductors. When a connection conductor is to be secured to the surface on which the radiation is incident, the area required for said connection is minimized so as to be able to use the maximum part of the surface as a sensitive surface, as a result of which the thermal contact also between the connection conductor and the electrode is restricted. When using a transparent auxiliary electrode layer, a maximum part of the two electrodes may be used for securing the connection conductors so that the heat dissipation can be considerably improved.

Figure 2:
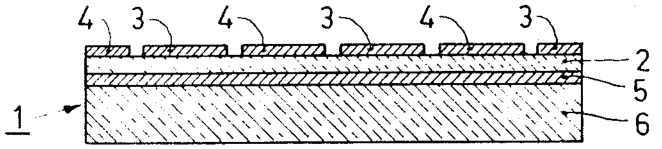
Figure 3:
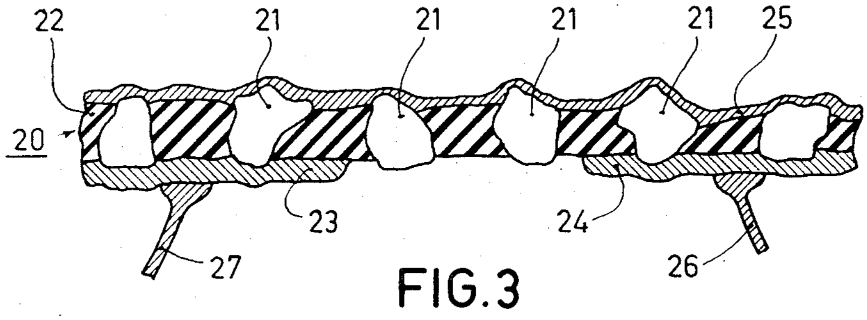

In order that the invention may be readily carried into effect, a few examples thereof will now be described in greater detail with reference to the accompanying drawing, in which FIG. 1 diagrammatically shows a plan view of a photosensitive device according to the invention, and FIG. 2 diagrammatically shows a cross-sectional view of said device taken on the line II—II of FIG. 1, FIG. 3 shows diagrammatically a cross-sectional view of another embodiment of a photosensitive device according to the invention.

The photosensitive device shown in FIGS. 1 and 2 comprises a body 2 in the form of a layer of a photosensitive material, the body 2 being provided with two electrodes 3 and 4 to which connection conductors 7 and 8 are secured. According to the invention, the two electrodes 3 and 4 are located on the same side of the body 2 and the oppositely located side of the body 2 comprises an auxiliary electrode layer 5, which is preferably transparent, that is to say, is permeable at least to part of the frequency range of the electromagnetic radiation to which the stratified body 2 is sensitive.

The auxiliary electrode layer 5 is arranged between the stratified body 2 and a transparent substrate 6.

In the present example, the layers 2 and 5 and the electrodes 3, 4 are provided on a glas substrate 6 in a manner commonly used in technology. The auxiliary electrode layer 5 consists of tin oxide and has a thickness of approximately 0.2 $\mu$m. The photosensitive layer has a thickness, for example, of 15 $\mu$m and consists of an $A_{II}$-$B_{VI}$ compound, in this case cadmium selenide. The electrodes 3 and 4 deposited from the vapour phase are constructed as an interdigital pattern of electrodes and may consist of gold. The width of the strips of the electrode pattern is, for example 2 mm, the distance adjacent strips of various electrodes may be 100 $\mu$.

In the example shown in FIG. 3, the stratified body is constituted by a monograin layer 21, 22 which is a layer of grains, thickness approximately one grain, which contains photosensitive grains 21 which cohere by means of an insulating binder 22. The grains 21 consist, for example, of cadmium sulphide which is doped with 0.1 to 0.01 at.% of copper. The diameter of the grains is approximately 40 $\mu$m. The insulating binder 22 is a polyurethane resin and extends only over part of the layer thickness so that parts of the grains 21 project from the binder as a result of which contact with the electrodes 23 and 24 and the auxiliary electrode layer 25 is possible. The electrodes 23, 24 consist, for example, of indium and have a thickness of approximately 0.3 $\mu$m. The auxiliary electrode layer 25 may be an indium layer of 100 A. thickness.

The interdigital electrode pattern 3, 4 and the electrodes 23, 24 may be provided with connection conductors 7, 8, 27 and 26 in a conventional manner and the devices 1 and 20 may be provided in a conventional manner with an envelope commonly used for a photosensitive device which envelope may consist, for example, of an embedding of a synthetic resin.

The auxiliary electrode layer 5, 25, is not provided with a connection conductor, that is to say not with a connection conductor which is meant to set up a bias voltage at the auxiliary electrode layer. In a circuit arrangement which employs a photosensitive device according to the invention, a potential difference is set up between the electrodes 7; 27 and 8; 26, while the auxiliary electrode layer 5, 25 is floating or, in other words, is not connected to a point in a circuit, as a result of which the auxiliary electrode layer would assume a potential differing from that which it would assume in the absence of the said connection.

It will be obvious that the invention is not restricted to the examples described and that many variations are possible to those skilled in the art without departing from the scope of this invention. For example, other materials may be used. The electrodes may consist of Al or another commonly used electrode material. As photosensitive materials are to be considered in addition to cadmium sulphide, materials such as silicon, selenides and tellurides or mixtures of photosensitive materials in which said materials may be doped in the conventional manner with normal impurities. The electrodes 3, 4 may be transparent and consist, for example, of a thin layer of gold. They may be provided directly on the substrate, the free surface of the photosensitive layer being provided with an auxiliary electrode. The substrate may be manufactured from a ceramic material, for example, Alundum.

What is claimed is:

1. A photosensitive device comprising a layer containing photosensitive material, said layer having opposed major surfaces, first and second spaced electrodes on the same one major surface of the photosensitive layer and contacting at least part of the photosensitive material, connection conductor means connected to the first and second electrodes for effecting external circuit connection to said photosensitive layer, a third auxiliary electrode on the opposite major surface of the photosensitive layer and contacting substantially all of the photosensitive material accessible on that opposite surface, and a substrate mounted to the layer with the auxiliary electrode between the substrate and the layer, the substrate and the auxiliary electrode being permeable to radiation to which the material is photosensitive, whereby the device exhibits properties as if the effective spacing between the first and second electrodes were different from the actual effective spacing without the auxiliary electrode.

2. A photosensitive device comprising a photosensitive layer having opposed major surfaces, first and second spaced electrodes contacting and covering separate portions of the first major surface of said layer, a third electrode contacting and covering at least part of the opposite second major surface of said layer, portions of said third electrode opposing at least part of each of said covered separate portions of said first major surface, said first and second electrodes being exposable to and permeable to radiation to which said layer is photosensitive, whereby the photoresistance exhibited between said first and second electrodes in response to irradiating said first major surface is substantially independent of the spacing between said first and second electrodes.

3. A photosensitive device as set forth in claim 2 wherein said photosensitive layer comprises a monograin layer containing a layer of grains of photosensitive material bound together by an insulating binder, said electrodes contacting at least some of said grains.

4. A photosensitive device comprising a monograin layer containing a layer of grains of photosensitive material bound together by an insulating binder, said layer having opposed major surfaces, first and second spaced electrodes on the same one major surface of the monograin layer and contacting at least part of the photosensitive grains, connection means connected to the first and second electrodes for effecting external circuit connection to said photosensitive device, and a third auxiliary electrode on the opposite major surface of the monograin layer and contacting substantially all of the photosensitive grains accessible on that opposite surface.

5. A photosensitive device as set forth in claim 4 wherein the auxiliary electrode is permeable to radiation to which the material is photosensitive.

6. A circuit arrangement comprising a photosensitive device as set forth in claim 4 and including means for applying a potential difference between the connection conductor means, said auxiliary electrode remaining in a floating condition.

7. A photosensitive device as set forth in claim 4 wherein the photosensitive material comprises an $A_{II}$–$B_{VI}$ compound.

8. A photosensitive device comprising a photosensitive layer having opposed major surfaces, first and second spaced electrodes contacting and covering separate portions of the first major surface of said layer, a third electrode contacting and covering at least part of the opposite second major surface of said layer, portions of said third electrode opposing at least part of each of said covered separate portions of said first major surface, said third electrode being exposable to and permeable to radiation to which said layer is photosensitive at least over part of the portion thereof opposing said first electrode and at least over part of the portion thereof opposing said second electrode, whereby the photoresistance exhibited between said first and second electrodes in response to irradiating said second major surface is substantially independent of the spacing between said first and second electrodes.

9. A photosensitive device as set forth in claim 8 including means for effecting external circuit connection to said first and second electrodes.

10. A circuit arrangement comprising a photosensitive device as set forth in claim 8 and means for applying a voltage potential between said first and second electrodes, said third electrode remaining in a floating condition.

11. A photosensitive device as set forth in claim 8 wherein said photosensitive layer comprises a monograin layer containing a layer of grains of photosensitive material bound together by an insulating binder, said electrodes contacting at least some of said grains.

12. A photosensitive device as set forth in claim 8, wherein said first and second electrodes are exposable to and permeable to radiation to which said layer is photosensitive, whereby the photoresistance exhibited between said first and second electrodes in response to irradiating said first major surface is substantially independent of the spacing between said first and second electrodes.

* * * * *